United States Patent
Kim et al.

(10) Patent No.: US 10,366,954 B1
(45) Date of Patent: Jul. 30, 2019

(54) STRUCTURE AND METHOD FOR FLEXIBLE POWER STAPLE INSERTION

(71) Applicant: GLOBALFOUNDRIES INC., Grand Cayman (KY)

(72) Inventors: Juhan Kim, Santa Clara, CA (US); Mahbub Rashed, Cupertino, CA (US); Navneet Jain, Milpitas, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/962,065

(22) Filed: Apr. 25, 2018

(51) Int. Cl.
*H01L 23/528* (2006.01)
*H01L 23/522* (2006.01)
*G06F 17/50* (2006.01)
*H01L 27/02* (2006.01)
*H01L 23/50* (2006.01)

(52) U.S. Cl.
CPC ...... *H01L 23/5286* (2013.01); *G06F 17/5072* (2013.01); *G06F 17/5077* (2013.01); *H01L 23/50* (2013.01); *H01L 23/5226* (2013.01); *H01L 27/0207* (2013.01)

(58) Field of Classification Search
CPC . H01L 23/5286; H01L 23/50; H01L 23/5226; H01L 27/0207; G06F 17/5072; G06F 17/5077
See application file for complete search history.

(56) References Cited

U.S. PATENT DOCUMENTS

| | | | |
|---|---|---|---|
| 6,320,813 B1 | 11/2001 | Kant | |
| 6,598,206 B2 | 7/2003 | Darden et al. | |
| 8,173,491 B2 | 5/2012 | Law et al. | |
| 8,914,765 B2 | 12/2014 | Sigal et al. | |
| 9,026,977 B2 | 5/2015 | Tarabbia et al. | |
| 9,035,393 B2 | 5/2015 | Ma et al. | |
| 9,035,679 B2 | 5/2015 | Yuan et al. | |
| 9,397,004 B2 | 7/2016 | Bouche et al. | |
| 9,639,650 B2 | 5/2017 | Yuan et al. | |
| 9,704,918 B2 | 7/2017 | Miyakawa et al. | |
| 9,748,251 B1 | 8/2017 | Ogino | |
| 9,831,230 B2 | 11/2017 | Tien et al. | |
| 2012/0233575 A1* | 9/2012 | Kashyap | G06F 17/5068 716/55 |
| 2014/0264924 A1 | 9/2014 | Yu et al. | |
| 2014/0282289 A1* | 9/2014 | Hsu | G03F 7/70433 716/51 |
| 2015/0333008 A1 | 11/2015 | Gupta et al. | |
| 2017/0294448 A1 | 10/2017 | Debacker et al. | |

\* cited by examiner

*Primary Examiner* — David Vu

(74) *Attorney, Agent, or Firm* — Gibb & Riley, LLC; David A. Cain, Esq.

(57) ABSTRACT

In an exemplary structure, a first conductor connects a power source to integrated circuit devices. The first conductor includes a first axis defining a first side and a second side. A second conductor, perpendicular to the first conductor, is connected to the first conductor by first vias. A third conductor, parallel to the first conductor, is connected to the second conductor by second vias. The third conductor includes a second axis defining a third side and a fourth side. The first side and the third side are aligned in a first plane perpendicular to the conductors and the second side and the fourth side are aligned in a second plane perpendicular to the conductors. The first vias contact the first conductor in only the first side. The second vias contact the third conductor in only the third side. And the second conductor is outside the second plane.

6 Claims, 8 Drawing Sheets

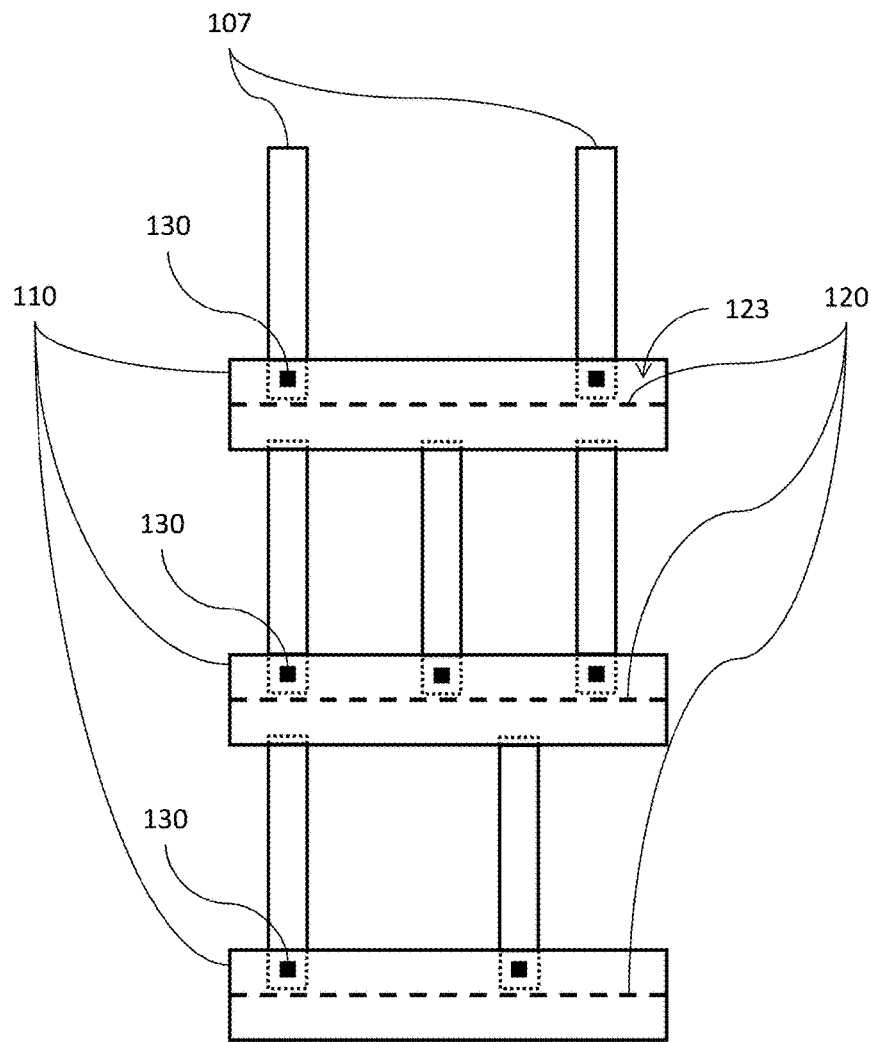
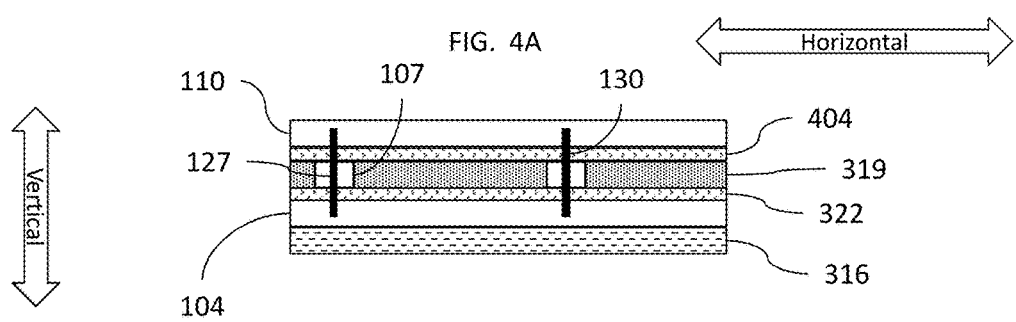
FIG. 4A
FIG. 4B

STRUCTURE AND METHOD FOR FLEXIBLE POWER STAPLE INSERTION

BACKGROUND

The present disclosure relates to integrated circuit (IC) cell design and, more particularly, to methods of enhancing power staple insertion.

Computer-aided cell-based design has been developed for quickly designing large scale ICs, such as application specific integrated circuits (ASICs) and gate arrays. The cell is a circuit that has been pre-designed and pre-verified as a building block. Design technologies known as standard cells and gate arrays use different types of such building blocks. A standard cell is an integrated circuit that may be implemented with digital logic. An ASIC, such as a system-on-chip (SoC) device, may contain thousands to millions of standard cells. In a standard cell design, each distinct cell in a library may have unique geometries of active, gate, and metal levels. Examples of a standard cell or gate array cell include an inverter, a NAND gate, a NOR gate, a flip-flop, and other similar logic circuits.

During the process of designing an integrated circuit, a designer may select particular cells from a library of cells and use them in a design. The library includes cells that have been designed for a given IC manufacturing process, such as complementary metal oxide semiconductor (CMOS) fabrication. The cells generally have a fixed height but a variable width, which enables the cells to be placed in rows. Cells typically do not change from one design to the next, but the way in which they are interconnected may, in order to achieve the desired function in a given design. By being able to select the cells from the library for use in the design, the designer can quickly implement a desired functionality without having to custom design the entire integrated circuit from scratch. Thus, the designer will have a certain level of confidence that the integrated circuit will work as intended when manufactured, without having to worry about the details of the individual components that make up each cell.

Cells are normally designed so that routing connections between cells can be made as efficiently as possible. Routing in an IC design is accomplished through routing elements, such as wires in one or more metal layers. Each metal layer is separated from other metal layers by insulating layers, and vias are used to connect one metal layer to another. These routing elements perform at least two functions: they connect individual components that make up a cell, and they connect cells to each other globally (i.e., on a chip-level) to implement the desired functionality of the integrated circuit. For example, clock signals, reset signals, test signals, and power supply voltages may be carried through such routing elements. A well-designed cell layout minimizes congestion in routing global interconnections, which reduces the number of metal layers in or overall size of an integrated circuit layout.

It is useful to construct multi-layer circuits in a way that applied voltages and ground can be accessed as easily as possible. One layer of the multi-layer circuit is the PC (polysilicon) layer, and this layer holds the logic structure in field effect transistor (FET) gates. M0 is the first metal layer that mostly holds the source/drain contacts and the gate contact of the FETs but may also contain interconnections in a horizontal direction. M0 conductors that connect to a source, drain, or gate are often noted as the M0 pin of standard cells. M1 is the second metal layer that is typically reserved for the output pin or a power staple, as well as routing. M2 is the third metal layer that is typically reserved for routing. Other metal layers for power or routing, etc. can be used. Connections between various layers are made by vertical electrical connectors that pass through the wafer called vias where, for example, V0 links M0 to M1, and V1 links M1 to M2.

In order to reduce the size of such structures, sophisticated processes, such as self-aligned double patterning (SADP) can be used, and this can follow a uni-directional design style, wherein M0 and M2 are horizontal and M1 is vertical. That is, in the uni-directional design style, a horizontal M1 conductor is not used, and a power staple stitches the M0 and M2 conductors. The function of the power staple is, therefore, equivalent to the via contacts of other nodes that connect two horizontal conductors.

SUMMARY

An exemplary structure herein includes a first conductor that connects a power source to integrated circuit devices. The first conductor includes a first axis defining a first side and a second side of the first conductor. A second conductor is connected to the first conductor by first vias extending perpendicular from the first conductor. The second conductor is perpendicular to the first conductor. A third conductor is connected to the second conductor by second vias extending perpendicular from the second conductor. The third conductor is parallel to the first conductor. The third conductor includes a second axis defining a third side and a fourth side of the third conductor. The first side of the first conductor and the third side of the third conductor are aligned in a first plane perpendicular to the conductors and the second side of the first conductor and the fourth side of the third conductor are aligned in a second plane perpendicular to the conductors. The first vias contact the first conductor in only the first side. The second vias contact the third conductor in only the third side. And the second conductor is outside the second plane.

According to structures herein, an exemplary structure includes a layer of integrated circuit devices. A first insulator layer is on the layer of integrated circuit devices, wherein the first insulator layer is parallel to the layer of integrated circuit devices. A first conductor is located in a first conductor layer. The first conductor layer is parallel to the first insulator layer. The first conductor connects a power source to the layer of integrated circuit devices by an electrical contact extending perpendicular through the first insulator layer. The first conductor includes a first axis defining a first side and a second side of the first conductor. The first axis is in approximately the middle of the first conductor. A second insulator layer is on the first conductor layer, wherein the second insulator layer is parallel to the first conductor layer. A second conductor is located in a second conductor layer. The second conductor layer is parallel to the second insulator layer. The second conductor is connected to the first conductor by first vias extending perpendicular through the second insulator layer. The second conductor is perpendicular to the first conductor. A third insulator layer on the second conductor layer, wherein the third insulator layer is parallel to the second conductor layer, a third conductor is located in a third conductor layer. The third conductor layer is parallel to the third insulator layer. The third conductor is connected to the second conductor by second vias extending perpendicular through the third insulator layer. The third conductor is parallel to the first conductor. The third conductor includes a second axis defining a third side and a fourth side of the third conductor. The second axis is in approximately the middle of the third conductor. The first side of the first conductor is aligned with the third side of the third conductor in a first plane perpendicular to the conductor layers and the second side of the first conductor is aligned with the fourth side of the third conductor in a second plane perpendicular to the conductor layers. The first vias contact the first conductor in only the first side. The second vias contact the third conductor in only the third side. And the second conductor is outside the second plane.

According to exemplary methods herein, a design for an integrated circuit chip is received. A layout design is generated for placement of integrated circuit devices on the integrated circuit chip. The layout design includes a power distribution structure for the integrated circuit devices. The power distribution structure includes a first conductor connecting a first integrated circuit device to a power source. The first conductor includes a first axis defining a first side and a second side of the first conductor. The first axis is in approximately the middle of the first conductor. A second conductor is connected to the first conductor by first vias located in only the first side of the first conductor. The second conductor is perpendicular to the first conductor. A placement process is performed to place the first integrated circuit device on the integrated circuit chip based upon the layout design. The layout design is modified by adding a cut made in the second conductor, parallel to the first conductor and located in an area of the second side of the first conductor. An integrated circuit chip is fabricated based on the modified layout design.

BRIEF DESCRIPTION OF THE DRAWINGS

The structures and methods herein will be better understood from the following detailed description with reference to the drawings, which are not necessarily drawn to scale and in which:

FIG. 4A is a top view schematic diagram illustrating a layer of a cell according to embodiments herein;

FIG. 4B is a side view schematic diagram illustrating layers of a cell according to embodiments herein;

DETAILED DESCRIPTION

Figure 1:
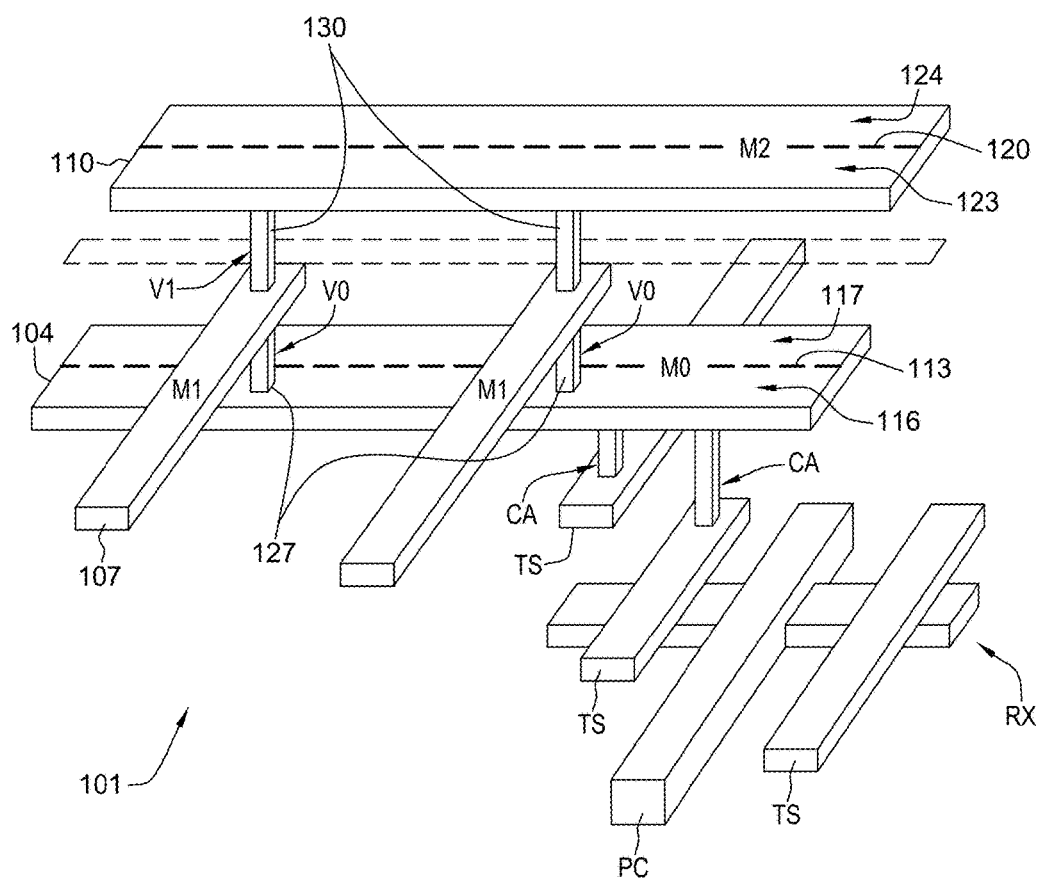
FIG. 1 is a perspective view of a power distribution structure according to embodiments herein.

The disclosure will now be described with reference to a structure and method to enhance power staple insertion in an integrated circuit design. While the disclosure will be described hereinafter relating to specific structures and methods thereof, it will be understood that limiting the disclosure to such specific structures and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. The drawings are not to scale; however, in the drawings, like reference numerals have been used throughout to identify identical elements.

It will be readily understood that the structures and methods of the present disclosure, as generally described and illustrated in the drawings herein, may be arranged and designed in a wide variety of different configurations in addition to the structures and methods described herein. Thus, the following detailed description of the structures and methods, as represented in the drawings, is not intended to limit the scope defined by the appended claims but is merely representative of selected structures and methods. The following description is intended only by way of example, and simply illustrates certain concepts of the structures and methods, as disclosed and claimed herein.

In order to place a power staple randomly regardless of placing even and odd cells, a cut layer is placed only one side of predetermined region on the conductor, where M0 and M2 conductors are placed horizontally, and M1 layer is vertically arrayed (when viewing from the top or plan view, conductors in M1 run perpendicular to conductors in M0 and M2). For example, the cut is placed on the upper half side of the M2 and M0 conductors, while standard cells flipped and arrayed with every two rows to abut p-well and n-well for sharing. The power staple is also shared with the upper cell and the lower cell. With this power staple arrangement, odd cells and even cells can be mixed without any power staple drop issue, which enables flexible power staple drop on the conductor region.

The systems and methods herein provide a standard cell architecture that has conductors in first and third metal layers (M0 and M2) in a horizontal orientation, and a second metal layer (M1) in a vertical orientation (again, in plan view). With these structures, input pins are on the M0 layer, and output pins are on the M1 layer. These structures are very suitable for high performance design, wherein dense staple insertion is desired.

Referring now to FIG. 1, a power distribution structure according to structures and methods herein is indicated generally as 101. The power distribution structure 101 may include a plurality of conductors, which may include power rails, ground lines, and signal lines, such as a first conductor (M0) 104, a second conductor (M1) 107, and one or more additional conductors, such as a third conductor (M2) 110. The M2 conductor 110 is substantially parallel to the M0 conductor 104, while the M1 conductor 107 is perpendicular to the M0 conductor 104 and the M2 conductor 110 (and M0-M2 lie in different parallel planes). The power distribution structure 101 may be connected to a standard cell and a power source in order to provide power to the standard cell, in which the power distribution structure 101 may be connected to one or more active components, as would be known to one of ordinary skill in the art.

In the fabrication of such standard cell, a plurality of semiconductor devices (e.g., transistors, resistors, capacitors, and the like) are formed on a semiconductive substrate. The semiconductor devices are then locally interconnected to produce the integrated circuit, such as a logic circuit or a memory cell. To enable the local interconnection of the semiconductor devices, device-level conductive structures or "plugs" are formed in contact with the electrically-active areas of the substrate (commonly designated as "RX") and the gate conductors (commonly designated as "PC"), and local interconnect conducive lines are formed in contact with the device-level plugs of the semiconductor device.

Figure 2:
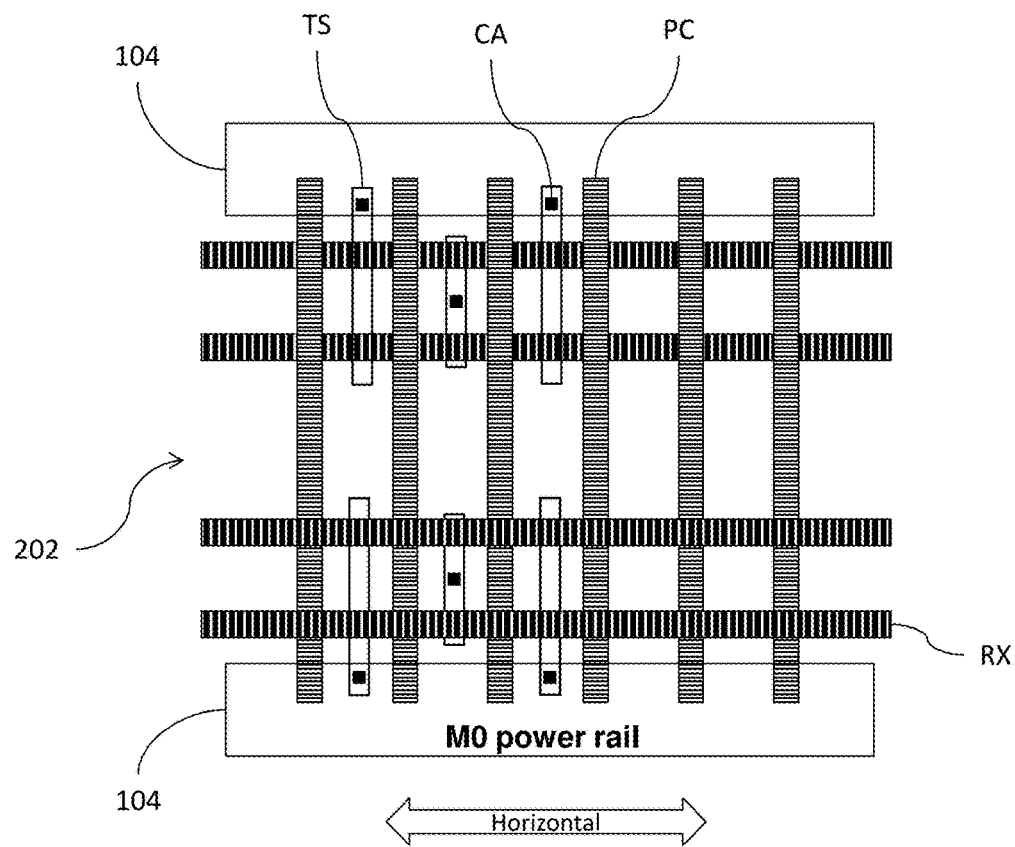
FIG. 2 is a top view of a cell according to embodiments herein.

In many cases, such as in replacement gate-based processes, the local interconnect lines and device-level plugs are divided into three general categories: (i) trench-with-late-silicide contacts (referred to herein as "TS contacts") in contact with RX; (ii) local interconnect lines (referred to herein as "CA contacts") in contact with the TS contacts; and (iii) plugs in contact with PC (not shown) (referred to herein as "CB contacts"). The TS, CA, and CB contacts are collectively referred to herein as the "local contacts." The local contacts may also include shared TS/CA/CB contacts, which provide an electrically-bridged connection to both RX and PC. The TS contact can also include a direct liner contact to RX, for instance by means of a Ti/TiN liner, without involving a silicidation and etch process. Typically, the CA and CB contacts extend vertically through interlayer dielectric (ILD) material from a metal wire or via in the first conductor (M0) 104 to the active component. After formation of the local contacts, the fabrication process advances to back end-of-the-line (BEOL) processing during which additional BEOL layers, such as in the power distribution structure 101, are formed to globally interconnect the integrated circuits, which are subsequently separated into individual die during wafer dicing. There may be multiple conductors, such as power rails, ground lines, and signal lines, in each metallization layer (i.e., M0, M1, M2, etc.). FIG. 2 is an exemplary horizontal view of connections, indicated generally as 202, from a standard cell to M0 conductors 104. As would be known by one of ordinary skill in the art, the conductors may be formed in a layer in which a metal line is formed in a dielectric material.

Referring again to FIG. 1, the M0 conductors 104 include a first axis 113 defining a first side 116 and a second side 117 of the M0 conductors 104. The first axis 113 is in approximately (meaning within 5%, 10%, 20%, etc., of) the middle of the M0 conductors 104. That is, the first axis 113 is located in an area within 5%, 10%, 20%, etc. of an imaginary line along the center of the M0 conductors 104. The M2 conductors 110 include a second axis 120 defining a third side 123 and a fourth side 124 of the M2 conductors 110. The second axis 120 is in approximately the middle of the M2 conductors 110. That is, the second axis 120 is located in an area within 5%, 10%, 20%, etc., of an imaginary line along the center of the M2 conductors 110. As illustrated in FIG. 1, the first side 116 of the M0 conductors 104 are aligned with the third side 123 of the M2 conductors 110 and the second side 117 of the M0 conductors 104 are aligned with the fourth side 124 of the M2 conductors 110.

The M1 conductors 107 are connected to the M0 conductors 104 by first vias (V0) 127 and the M1 conductors 107 are connected to the M2 conductors 110 by second vias (V1) 130. According to structures and methods herein, the first vias (V0) 127 are connected to the M0 conductors 104 in only the first side 116 of the M0 conductors 104. Additionally, according to structures and methods herein, the second vias (V1) 130 are connected to the M2 conductors 110 in only the third side 123 of the M2 conductors 110.

Figures 3A, 3B:
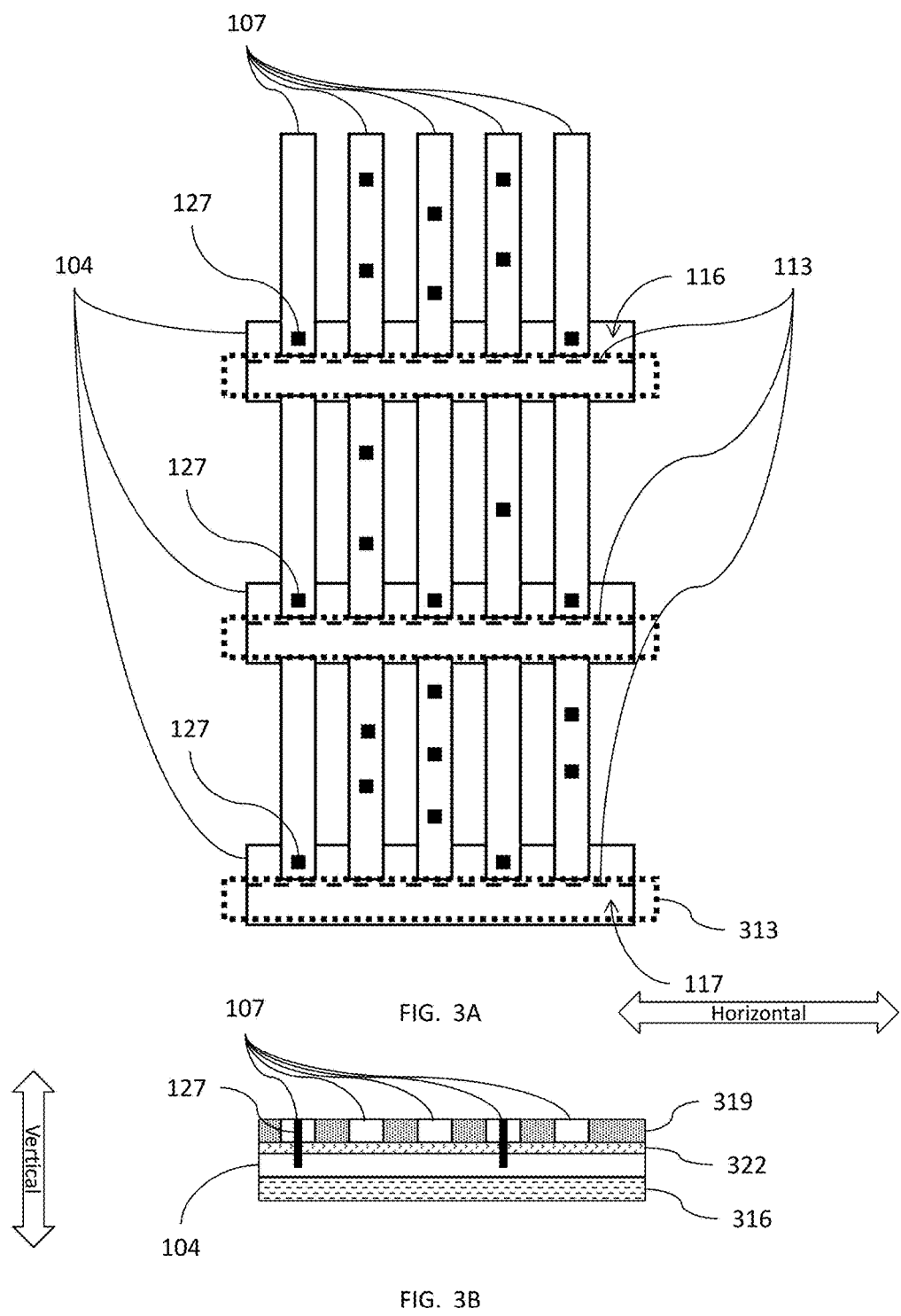
FIG. 3A is a top view schematic diagram illustrating a layer of a cell according to embodiments herein.
FIG. 3B is a side view schematic diagram illustrating layers of a cell according to embodiments herein.

FIG. 3A shows exemplary connections between M0 conductors 104 and M1 conductors 107. The first vias (V0) 127 between the M0 conductors 104 and the M1 conductors 107 are connected to the M0 conductors 104 only in the first side 116 of the M0 conductors 104. In forming the M1 conductors 107, a conductor, such as a single metal wire may be connected to each of the M0 conductors 104 at the first vias (V0). Then the M1 conductor 107 is cut (is non-continuous or discontinuous, or contains a break) on the second side 117 of the M0 conductors 104, as indicated by the broken line boxes indicated as 313 in FIG. 3A. In this way, the M1 conductors 107 are at the same height such that parasitic capacitance is balanced. The M1 conductors 107 do not overlap the second side 117 of the M0 conductors 104.

As shown in FIG. 3B, the M0 conductors 104 may be formed on a substrate or insulator layer, such as bottom layer 316, which may be an insulator layer located on the standard cell 202. Additionally, the conductors may be located in metallization layers formed by metal filled trenches in a suitable interlayer dielectric (ILD) material (e.g., borophosphosilicate glass (BPSG), tetraethyl orthosilicate (TEOS), fluorinated tetraethyl orthosilicate (FTEOS), etc.). For example, the M1 conductors 107 may be located in a metallization layer, sometime referred to as the M1 layer 319. The M1 layer 319 may be on a first insulator layer 322, which can be made of any suitable insulator material (e.g., a buried oxide (BOX) layer). As would be understood by those ordinarily skilled in the art, integrated circuit devices (e.g., transistors, resistors, capacitors, and the like) are component of standard cells; however, because standard cells are well known, and to avoid clutter, such integrated circuit devices are not illustrated or discussed.

Figure 3C:
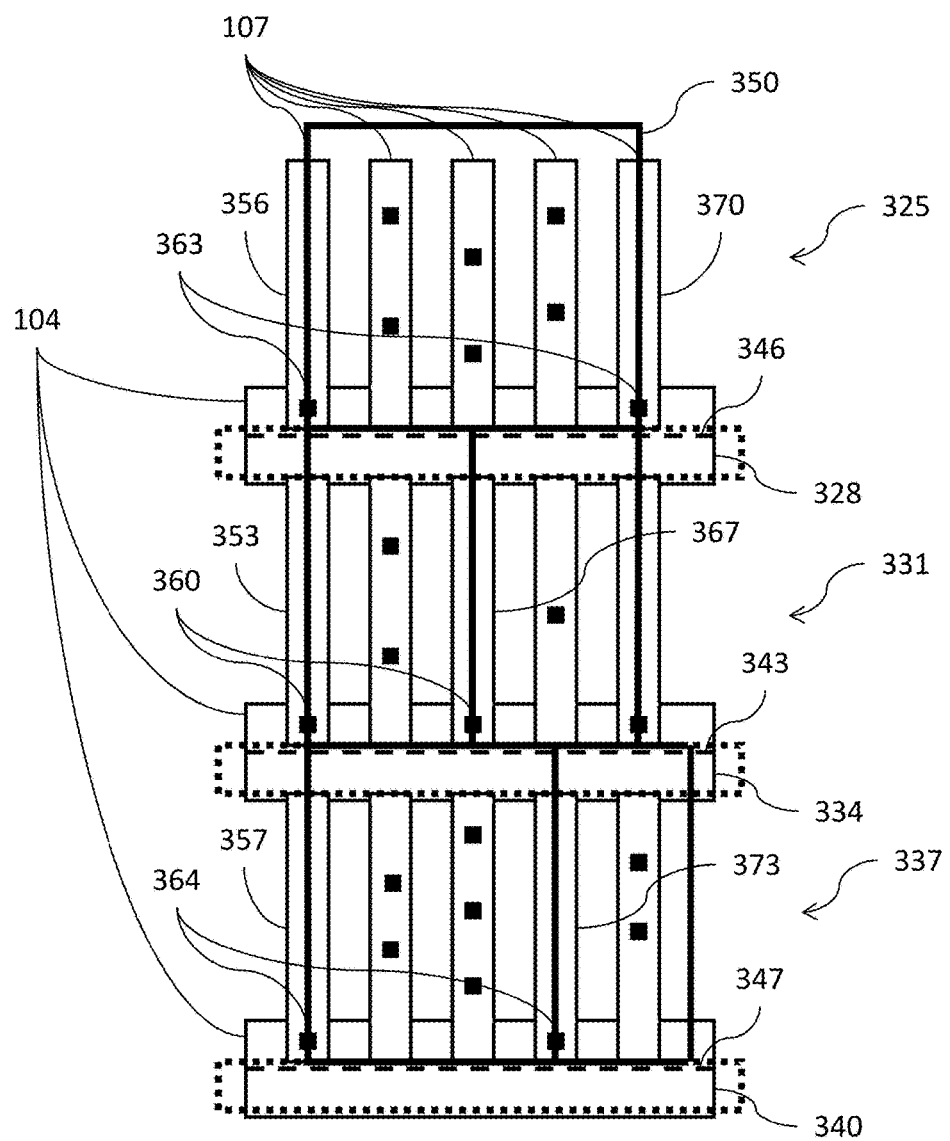
FIG. 3C is a top view schematic diagram illustrating a layer of a cell according to embodiments herein.

FIG. 3C shows a specific example of a series of standard cells having stapes to connect various conductors. In the top cell 325, the M0 conductor 104 is a power line 328. In the middle cell 331, the M0 conductor 104 is a ground line 334. In the bottom cell 337, the M0 conductor 104 is another power line 340. The specific example illustrated in FIG. 3C shows a structure configuring a standard cell layout with ground staples providing a ground source and power staples providing a power source. In this example, the middle cell 331 is flipped. First conductors in a first conductor layer (M0) may include a ground line 334, a power lines 328, 340. The ground line 334 and power line 328 are parallel to each other. The ground line 334 includes a ground line axis 343 at approximately the centerline of the ground line 334. The ground line axis defines a first ground side in a first bottom region and a second ground side in a first top region. The power lines 328, 340 includes a power line axis 346, 347 at approximately the centerline of each power line 328, 340. The power line axes define a first power side in a second bottom region and a second power side in a second top region. Second conductors, which are perpendicular to the ground line 334 and power lines 328, 340, are in a second conductor layer (M1). The second conductors include signal lines 350 which are another part of the standard cell layout. The second conductor layer (M1) includes ground staples 353 and power staples 356, 357 which are placed on the standard cell layout. The ground staples 353 and the power staples 356, 357 are dropped after the standard cell placement is executed. In particular, the ground staples 353 are connected to the first ground side of the ground line 334 by first vias 360 for providing a ground source, and the power staples 356, 357 are connected to the first power side of the power lines 328, 340 by second vias 363, 364 for providing a power source. According to structures and methods herein, the ground staples 353 are placed in a select row, such as indicated at 367, while the power staples are placed in an upper adjacent row, such as indicated at 370, and a lower adjacent row, such as indicated at 373. The second conductor is cut by a horizontal cut mask indicated by the broken line boxes 313 to separate the ground staples 353 and the power staples 356, 357.

FIG. 4A shows exemplary connections between M1 conductors 107 and M2 conductors 110. In FIG. 4A, only the M1 conductors 107 that are connected to the M2 conductors 110 are shown. As with the first vias (V0) 127, the second vias (V1) 130 between the M1 conductors 107 and the M2 conductors 110 are connected to the M2 conductors 110 only in the third side 123 of the M2 conductors 110. As described above, the first side 116 of the M0 conductors 104 and the third side 123 of the M2 conductors 110 are aligned in a first plane perpendicular to the M0 and M2 conductors 104, 110 and the second side 117 of the M0 conductors 104 and the third side 123 of the M2 conductors 110 are aligned in a second plane perpendicular to the M0 and M2 conductors 104, 110.

As shown in FIG. 4B, the M2 conductors 110 may be on an insulator layer, such as second insulator layer 404, which can be made of any suitable insulator material (e.g., a buried oxide (BOX) layer).

Figure 5A:
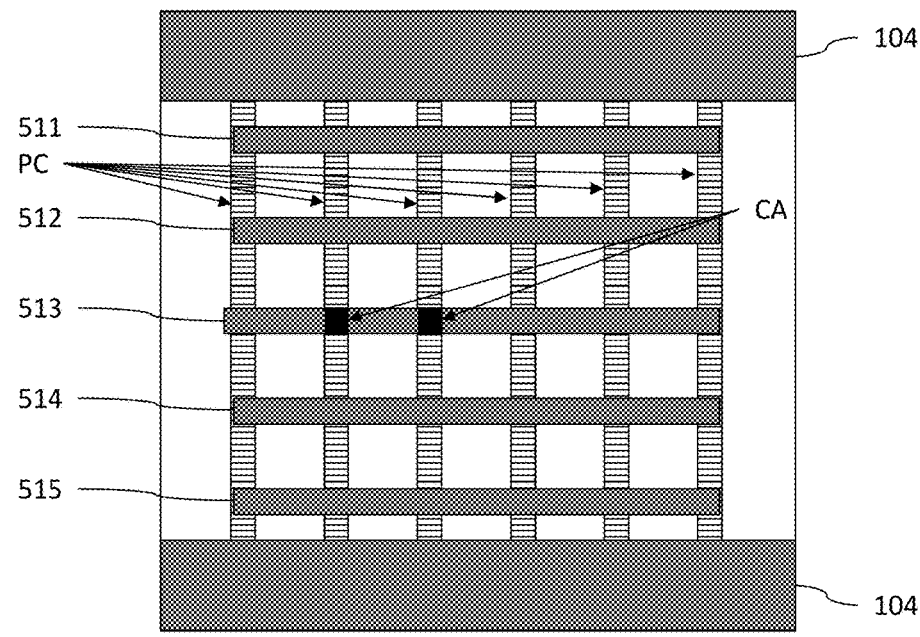
FIG. 5A is a top view schematic diagram illustrating a layer of a cell according to embodiments herein.
Figure 5B:
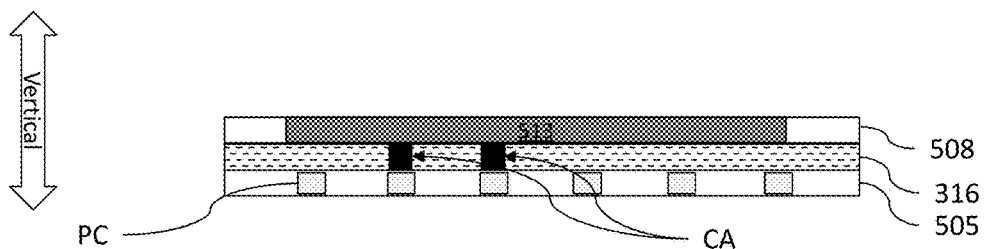
FIG. 5B is a side view schematic diagram illustrating layers of a cell according to embodiments herein.

FIGS. 5A/5B illustrate gate conductors PC in a transistor layer 505. As would be understood by those ordinarily skilled in the art, the gate conductors PC are a component of transistor structures, such as shown in FIG. 1; however, because transistor structures are well known, and to avoid clutter, such structures are not illustrated or discussed. FIGS. 5A/5B also illustrate the M0 layer 508 that includes parallel linear M0 conductors 511-515 and M0 conductors 104 extending in a horizontal direction (shown by block arrow in the drawing) overlying the transistor layer 505. FIG. 5B illustrates that the bottom layer 316 contacts and is between the transistor layer 505 and the M0 layer 508.

As shown in FIG. 5A, the M0 conductors 511-515 are between the M0 conductors 104 within the plane of the M0 layer 508. Further, FIGS. 5A/5B show contacts CA that electrically connect the conductive portions of the middle conductor 513 (M0) to the gate conductors PC through the bottom layer 316. Also, as can be seen in FIG. 5A, the M0 conductors 511-515 and M0 conductors 104 are perpendicular to the gate conductors PC (while layers 505 and 508 are parallel layers).

Figure 6:
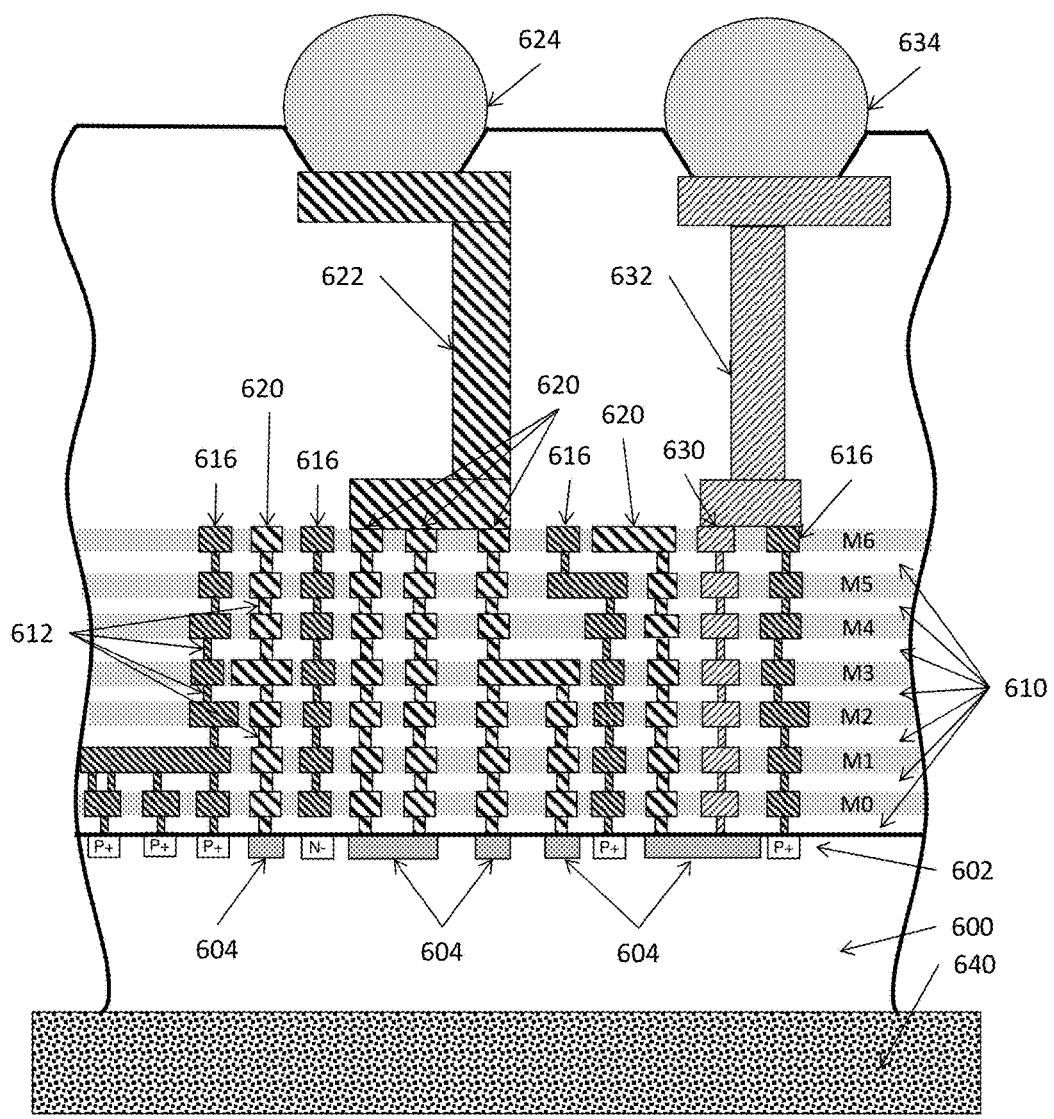
FIG. 6 is a cross-sectional view of a circuit structure according to embodiments herein.

Therefore, as shown in FIG. 6, such processing forms various integrated circuit structures that include (among other components) a device layer 602 on a substrate 600. The device layer 602, sometimes referred to herein as the transistor layer 505, has electronic devices 604. Also, with these structures, a multi-layer interconnect structure is connected to the device layer 602.

The multi-layer interconnect structure has insulator layers 610 alternating between the wiring layers M0-M6. power wiring 620 and ground wiring 630 may be included in the wiring layers M0-M6. Additional non-functional wiring 616 may also be included in the wiring layers M0-M6. As described above, conductive vias 612 extend through the insulator layers 610. The conductive vias 612 connect the power wiring 620 and ground wiring 630 in the wiring layers M0-M6 to the electronic devices 604 in the device layer 602. The conductive vias 612 may also connect the non-functional wiring 616 in the wiring layers M0-M6 to the substrate 600 and to the ground wiring 630. Power source and ground source connectors 622, 624, 632, 634 may be connected to the power wiring 620 and the ground wiring 630.

The non-functional wiring 616 is insulated from the power wiring 620 in the wiring layers M0-M6, and from the power or signals of the electronic devices 604 in the device layer 602. Thus, the wiring layers M0-M6 include an electrical connection from the non-functional wiring 616 to the substrate 600 or the ground wiring 630. In other words, the non-functional wiring 616 is only electrically connected to the grounded chuck 640 (e.g., through the substrate 600) or to the ground wiring 630.

The substrate 600 is electrically connected to ground to dissipate charge accumulated in the multi-layer interconnect structure; at least during manufacturing of the multi-layer interconnect structure. For example, the substrate 600 is connectable to the grounded chuck 640 that holds the substrate 600 during manufacturing of the multi-layer interconnect structure. Also, to promote static charge transfer to the grounded chuck 640, the substrate 600 can include conductive wells (p+) connected to the non-functional wiring 616. In other words, the conductive vias 612 connect the non-functional wiring 616 in the wiring layers M0-M6 to the substrate 600, thereby continually removing static charge that would otherwise accumulate during manufacturing processes.

Figure 7:
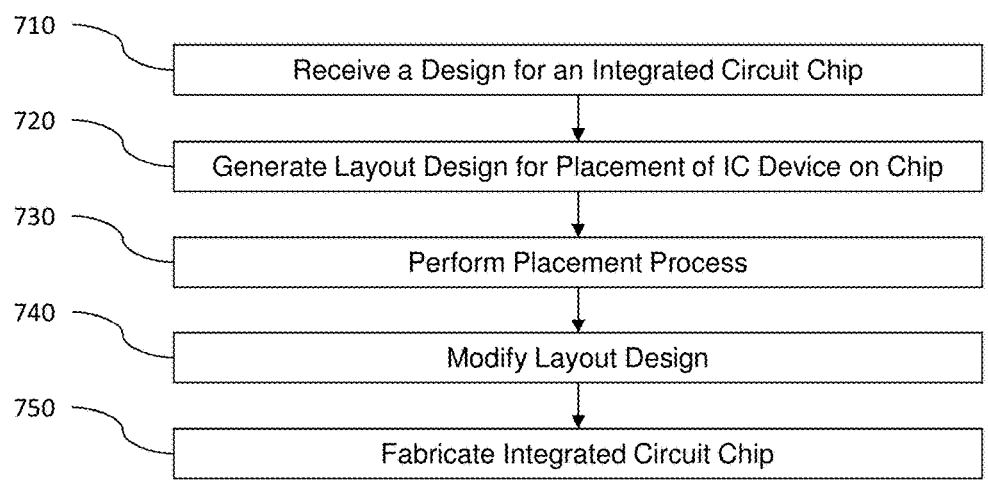
FIG. 7 is a flow diagram illustrating methods herein.

FIG. 7 is a flow diagram illustrating the processing flow of an exemplary method to enhance power staple insertion, such as described above. At 710, a design for an integrated circuit chip is received. At 720, a layout design is generated for placement of integrated circuit devices on the integrated circuit chip. The layout design includes a power distribution structure for the integrated circuit devices. The power distribution structure includes a first conductor connecting a first integrated circuit device to a power source. The first conductor includes a first axis defining a first side and a second side of the first conductor. The first axis is in approximately (meaning within 5%, 10%, 20%, etc., of) the middle of the first conductor. That is, the first axis is located in an area within 5%, 10%, 20%, etc. of an imaginary line along the center of the first conductor. A second conductor is connected to the first conductor by first vias located in only the first side of the first conductor. The second conductor is perpendicular to the first conductor. At 730, a placement process is performed to place the first integrated circuit device on the integrated circuit chip based upon the layout design. At 740, the layout design is modified by adding a cut made in the second conductor, parallel to the first conductor and located in an area of the second side of the first conductor, such that the second conductor does not extend beyond the second side of the first conductor. At 750, an integrated circuit chip is fabricated based on the modified layout design.

The structure and methods disclosed herein are particularly useful for 7 nm processing, which uses Self Aligned Double Patterning (SADP). SADP uses cut masks, because metal pitch is extremely tight in the nanometer structures, such that tight metal patterns (such as M0, M1, M2) are defined as "mandrel" and "nonmandrel". The mandrel defines a first long metal line, while nonmandrel defines the next long metal line. In constructing a standard cell, this mandrel/nonmandrel pair is repeated, which defines the metal patterns. After defining the metal patterns with mandrel and nonmandrel masks, cut masks are applied to cut for metal separation. According to structures and methods herein, perpendicular metal layers are connected with vias on a half-side of a metal line, so the cut mask can be applied to the other half-side of the metal line.

The design for the integrated circuit may be implemented in Library Exchange Format (LEF), which is a file that defines the cell design for each cell within the chip. The LEF file lists the size, type, and location of each pin within each cell. The layout design may be implemented in Design Exchange Format (DEF), which is a file that defines the layout of the various cells within the chip. The DEF file lists the coordinates, orientation, type, and routing for each cell within the chip. As can be understood, together the LEF/DEF files provide the information for locating every cell within the chip and every pin within each cell, however, these files provide no transistor level information.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

For electronic applications, semiconducting substrates, such as silicon wafers, can be used. The substrate enables easy handling of the micro device through the many fabrication steps. Often, many individual devices are made together on one substrate and then singulated into separated devices toward the end of fabrication. In order to fabricate a microdevice, many processes are performed, one after the other, many times repeatedly. These processes typically include depositing a film, patterning the film with the desired micro features, and removing (or etching) portions of the film. For example, in memory chip fabrication, there may be several lithography steps, oxidation steps, etching steps, doping steps, and many others are performed. The complexity of microfabrication processes can be described by their mask count.

The terminology used herein is for the purpose of describing particular structures and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and "including", when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The corresponding structures, materials, acts, and equivalents of all means or step plus function elements in the claims below are intended to include any structure, material, or act for performing the function in combination with other claimed elements as specifically claimed. The descriptions of the various structures and methods herein have been presented for purposes of illustration but are not intended to be exhaustive or limited to the structures and methods disclosed. Many modifications and variations will be apparent to those of ordinary skill in the art without departing from the scope and spirit of the described structures and methods. The terminology used herein was chosen to best explain the principles of the structures and methods, the practical application or technical improvement over technologies found in the marketplace, or to enable others of ordinary skill in the art to understand the structures and methods disclosed herein.

While various examples are described herein, it will be appreciated from the specification that various combinations of elements, variations, or improvements therein may be made by those skilled in the art and are within the scope of the disclosure. In addition, many modifications may be made to adapt a particular situation or material to the teachings of the disclosed concepts without departing from the essential scope thereof. Therefore, it is intended that the concepts not be limited to the particular examples disclosed as the best mode contemplated for carrying out the structures and methods herein, but that the structures and methods will include all features falling within the scope of the appended claims.

What is claimed is:

1. A method, comprising:
   receiving a design for an integrated circuit chip;
   generating a layout design for placement of integrated circuit devices on the integrated circuit chip, wherein the layout design includes a power distribution structure for the integrated circuit devices, the power distribution structure comprising:
      a first conductor in a first plane connecting a first integrated circuit device to a power source, wherein the first conductor includes a first axis defining a first side and a second side of the first conductor, the first axis being in approximately the middle of the first conductor, and
      a second conductor in a second plane parallel to the first plane, wherein the second conductor is connected to the first conductor by first vias extending in a second direction perpendicular to the first plane, and wherein the first vias contact the first conductor in only the first side of the first conductor, the second conductor being perpendicular to the first conductor;
   performing a placement process to place the first integrated circuit device on the integrated circuit chip based upon the layout design;
   creating a modified layout design by adding a cut in the second conductor, wherein the cut is parallel to the first conductor and located in an area of the second side of the first conductor; and
   fabricating an integrated circuit chip based on the modified layout design.

2. The method according to claim 1, wherein the power distribution structure further comprises:
   an electrical contact connecting the first conductor to the integrated circuit devices.

3. The method according to claim 2, wherein the electrical contact is connected to the first conductor in only the first side of the first conductor.

4. The method according to claim 2, wherein generating the layout design for placement of the integrated circuit devices on the integrated circuit chip further comprises:
   representing a physical layout of the integrated circuit using Library Exchange Format (LEF).

5. The method according to claim 1, wherein the power distribution structure further comprises:
   a third conductor in a third plane parallel to the first plane, wherein the third conductor is connected to the second conductor by second vias extending in the second direction, the third conductor being parallel to the first conductor, wherein the third conductor includes a second axis defining a third side and a fourth side of the third conductor, the second axis being in approximately the middle of the third conductor, and wherein the first side of the first conductor and the third side of the third conductor are aligned in the second direction and the second side of the first conductor and the fourth side of the third conductor are aligned in the second direction, and wherein the second vias contact the third conductor in only the third side.

6. The method according to claim 1, wherein the design for the integrated circuit includes odd and even standard cells.

\* \* \* \* \*